US012675909B2

(12) United States Patent
Hung et al.

(10) Patent No.: US 12,675,909 B2
(45) Date of Patent: Jul. 7, 2026

(54) AERIAL REFUELING SYSTEMS AND METHODS

(71) Applicant: The Boeing Company, Arlington, VA (US)

(72) Inventors: Fan Hin Hung, Los Angeles, CA (US); Deepak Khosla, Camarillo, CA (US); Neale Ratzlaff, Los Angeles, CA (US); Tameez Latib, Calabasas, GA (US); Haden Smith, Guyton, GA (US); Leon Nguyen, Santa Ana, CA (US)

(73) Assignee: The Boeing Company, Arlington, VA (US)

( * ) Notice: Subject to any disclaimer, the term of this patent is extended or adjusted under 35 U.S.C. 154(b) by 259 days.

(21) Appl. No.: 18/522,002

(22) Filed: Nov. 28, 2023

(65) Prior Publication Data

US 2025/0173898 A1 May 29, 2025

(51) Int. Cl.
*G06T 7/73* (2017.01)
*B64D 39/00* (2006.01)
(Continued)

(52) U.S. Cl.
CPC .................. *G06T 7/75* (2017.01); *G06T 3/40* (2013.01); *G06T 7/11* (2017.01); *G06V 10/25* (2022.01);
(Continued)

(58) Field of Classification Search
CPC .... G06T 7/70; G06T 7/73; G06T 7/75; G06T 7/10; G06T 7/11; G06T 2207/20132;
(Continued)

(56) References Cited

U.S. PATENT DOCUMENTS

| | | | |
|---|---|---|---|
| 7,980,512 B1 | 7/2011 | Speer | |
| 8,854,433 B1 | 10/2014 | Rafii | |

(Continued)

FOREIGN PATENT DOCUMENTS

| | | |
|---|---|---|
| CN | 110097574 | 8/2019 |
| EP | 3566949 A1 | 11/2019 |

(Continued)

OTHER PUBLICATIONS

Fu, Daoyong, et al. "The 6D pose estimation of the aircraft using geometric property." IEEE Transactions on Circuits and Systems for Video Technology 33.7 (2022): 3358-3368. (Year: 2022).*

(Continued)

*Primary Examiner* — Geoffrey E Summers
(74) *Attorney, Agent, or Firm* — Massey Bean & Lewis

(57) ABSTRACT

Disclosed herein are methods, systems, and aircraft for verifying performing automated refueling data. A method includes receiving a two-dimensional (2D) image from a camera, cropping the 2D image based on predefined feature areas of interest of a target object to produce a plurality of cropped images, resizing one or more of the cropped images responsive to the target object being greater than a threshold distance from the camera to produce one or more resized images, determining 2D keypoints of the target object within the one or more resized images or the plurality of cropped images, estimating a 6 degrees-of-freedom (6DOF) pose based on the 2D keypoints and a three-dimensional (3D) model of the target object to produce an estimated 6DOF pose, and outputting the 6DOF pose.

16 Claims, 6 Drawing Sheets

(51) Int. Cl.

| | |
|---|---|
| *G06T 3/40* | (2024.01) |
| *G06T 7/11* | (2017.01) |
| *G06V 10/25* | (2022.01) |
| *G06V 20/64* | (2022.01) |

(52) U.S. Cl.
CPC ............ *G06V 20/647* (2022.01); *B64D 39/00* (2013.01); *G06T 2207/20084* (2013.01); *G06T 2207/20132* (2013.01); *G06T 2207/30212* (2013.01); *G06T 2207/30252* (2013.01)

(58) Field of Classification Search
CPC ....... G06T 3/40; G06T 3/4007; G06T 3/4023; G06T 3/4046; G06T 3/4053; G06T 2207/30212; G06T 2207/30252; G06T 2207/20081; G06T 2207/20084; G06T 2207/20021; G06V 10/25; G06V 10/22; G06V 10/225; G06V 20/647; B64D 39/00–06; G06N 3/02–0985
See application file for complete search history.

(56) References Cited

U.S. PATENT DOCUMENTS

| | | | |
|---|---|---|---|
| 8,994,723 | B2 | 3/2015 | Drost et al. |
| 9,150,310 | B1 | 10/2015 | Bray et al. |
| 10,565,731 | B1 | 2/2020 | Reddy |
| 10,909,715 | B1 | 2/2021 | Boggs |
| 10,929,654 | B2 | 2/2021 | Iqbal |
| 10,937,189 | B2 | 3/2021 | Li et al. |
| 11,254,440 | B2 | 2/2022 | Ropers |
| 11,459,116 | B2 | 10/2022 | Kyono et al. |
| 11,748,913 | B2 | 9/2023 | Ali et al. |
| 11,827,203 | B2 | 11/2023 | Chakravarty et al. |
| 11,880,503 | B1 | 1/2024 | Haentjens |
| 12,139,271 | B2 | 11/2024 | Khosla |
| 2007/0023575 | A1 | 2/2007 | von Thal |
| 2017/0073080 | A1 | 3/2017 | Hughes |
| 2018/0173839 | A1 | 6/2018 | Fang |
| 2018/0178924 | A1 | 6/2018 | Zomeno Rodriguez |
| 2019/0031347 | A1 | 1/2019 | Duan |
| 2019/0344902 | A1 | 11/2019 | Cramblitt |
| 2019/0355150 | A1 | 11/2019 | Tremblay et al. |
| 2019/0382126 | A1 | 12/2019 | Rix et al. |
| 2020/0217666 | A1 | 7/2020 | Zhang |
| 2021/0117661 | A1 | 4/2021 | Iqbal |
| 2021/0304438 | A1 | 9/2021 | Ye |
| 2021/0314551 | A1 | 10/2021 | Tang |
| 2022/0075994 | A1* | 3/2022 | Shapira ................. G06F 18/214 |
| 2022/0108468 | A1 | 4/2022 | Nakamura |
| 2022/0212811 | A1* | 7/2022 | Khosla ................... G06V 10/46 |
| 2022/0215571 | A1 | 7/2022 | Leach |
| 2022/0258875 | A1* | 8/2022 | Kyono ................... G06V 20/56 |
| 2022/0276652 | A1 | 9/2022 | Kyono et al. |
| 2022/0277472 | A1 | 9/2022 | Birchfield et al. |
| 2022/0292772 | A1 | 9/2022 | Wang |
| 2022/0306311 | A1 | 9/2022 | Kyono |
| 2022/0413119 | A1 | 12/2022 | Starr |
| 2022/0414911 | A1 | 12/2022 | Wang |
| 2023/0244835 | A1 | 8/2023 | Guo |
| 2023/0281864 | A1 | 9/2023 | Guo |
| 2023/0281945 | A1 | 9/2023 | Cashman |
| 2024/0375786 | A1 | 11/2024 | Hung et al. |
| 2024/0378744 | A1 | 11/2024 | Smith et al. |
| 2024/0391494 | A1 | 11/2024 | Rosenblum et al. |
| 2025/0011002 | A1 | 1/2025 | Latib et al. |
| 2025/0022157 | A1 | 1/2025 | Latib et al. |
| 2025/0178741 | A1 | 6/2025 | Hung et al. |
| 2025/0182398 | A1 | 6/2025 | Hung et al. |

FOREIGN PATENT DOCUMENTS

| | | | | |
|---|---|---|---|---|
| EP | 4024340 | 7/2022 | | |
| EP | 4024346 | 7/2022 | | |
| WO | WO-2025003634 | A1 * | 1/2025 | ............... G06T 7/73 |

OTHER PUBLICATIONS

Hashemi, Mahdi. "Enlarging smaller images before inputting into convolutional neural network: zero-padding vs. interpolation." Journal of Big Data 6.1 (2019): 1-13. (Year: 2019).*

Lynch, J. C., Monocular Pose Estimation for Automated Aerial Refueling via Perspective-n-PointPerspective-n-Point, AFIT Scholar, Mar. 2022, pp. 1-76, accessed from https://scholar.afit.edu/cgi/viewcontent.cgi?article=7913&context=etd Jul. 17, 2024. (Year: 2022).*

Shi et al., Fast Uncertainty Quantification for Deep Object Pose Estimation, IEEE International Conference on Robotics and Automation, 2021, pp. 5200-5207. (Year: 2021).*

Saponara, Sergio, and Abdussalam Elhanashi. "Impact of image resizing on deep learning detectors for training time and model performance." International conference on applications in electronics pervading industry, environment and society. Cham: Springer International Publishing, 2021. (Year: 2021).*

Fornalczyk, Krzysztof, and Adam Wojciechowski. "Robust face model based approach to head pose estimation." 2017 Federated Conference on Computer Science and Information Systems (FedCSIS). IEEE, 2017. (Year: 2017).*

Extended European Search Report for EP Patent Application No. 21205493.6 dated Mar. 31, 2022.

Doebbler, et al., "Boom and Receptacle Autonomous Air Refueling Using Visual Snake Optical Sensor", Journal of Guidance and Control and Dynamics, Nov. 1, 2007, pp. 1753-1769, vol. 30, No. 6.

Anderson, et al., "Augmenting Flight Imagery from Aerial Refueling", Oct. 21, 2019, Computer Vision—ECCV 2020 : 16th European Conference, Glasgow, UK, Aug. 23-28, 2020, pp. 154-165, Proceedings; [Lecture Notes in Computer Science ; ISSN 0302-9743], Springer International Publishing, Cham.

Soujanya, et al. "Addressing corner detection issues for machine vision based UAV aerial refueling" Machine Vision and Applications, Springer, Jan. 10, 2007, pp. 261-276, vol. 18, No. 5, Berlin, DE.

Duan, et al., "Visual Measurement in Simulation Environment for Vision-Based UAV Autonomous Aerial Refueling", IEEE Transactions on Instrumentation and Measurement, IEEE, USA, Sep. 1, 2015, pp. 2468-2480, vol. 64, No. 9, USA.

Cui, et al., "Visual Servoing of a Flexible Aerial Refueling Boom With an Eye-in-Hand Camera", IEEE Transactions on Systems, Man, and Cybernetics: Systems, IEEE, Jan. 8, 2020, pp. 6282-6292, vol. 51, No. 10, Piscataway, NJ, USA.

Lakshminarayanan, et al. "Simple and Scalable Predictive Uncertainty Estimation using Deep Ensembles", 31st Conference on Neural Information Processing Systems (NIPS 2017), 2017, pp. 1-15, Long Beach, CA, USA.

Shen, et al., "Real-Time Uncertainty Estimation in Computer Vision via Uncertainty-Aware Distribution Distillation", Computer Vision Foundation, 2021, pp. 707-716.

Peng, et al., "PVNet: Pixel-wise Voting Network for 6DoF Pose Estimation", Computer Vision Foundation, pp. 4561-4570.

Brachmann, et al., "Uncertainty-Driven 6D Pose Estimation of Objects and Scenes from a Single RGB Image", Computer Vision Foundation, pp. 3364-3372.

Rasmussen, C.E., "Gaussian Processes in Machine Learning", Max Planck Institute for Biological Cybernetics, pp. 63-71, Tubingen, Germany.

Romano, et al., "Conformalized Quantile Regression", 33rd Conference on Neural Information Processing Systems, 2019, pp. 1-11, Vancouver, Canada.

Ratzlaff, et al. "Generative Particle Variational Inference via Estimation of Functional Gradients", Proceedings of the 38 th International Conference on Machine, 2021, pp. 1-22.

Tobin et al., "Domain Randomization for Transferring Deep Neural Networks from Simulation to the Real World", https://arxiv.org/pdf/1703.06907.pdf, accessed Dec. 5, 2023, pp. 1-8.

Mehta, et al. "Active Domain Randomization", https://arxiv.org/pdf/1904.04762.pdf, accessed Dec. 5, 2023, pp. 1-15.

(56)  References Cited

OTHER PUBLICATIONS

Akkaya. et al., "Solving Rubik's Cube With a Robot Hand", https://arxiv.org/pdf/1910.07113.pdf, accessed Dec. 5, 2023, pp. 1-51.

Extended European Search Report for EP Patent Application No. 24192391.1 dated Jan. 24, 2025, pp. 1-13.

Extended European Search Report for EP Patent Application No. 24192395.2 dated Jan. 24, 2025, pp. 1-12.

Li et al., Deep Supervision with Intermediate Concepts, IEEE Transactions on Pattern Analysis and Machine Intelligence, Aug. 2019, pp. 1828-1843, vol. 41, No. 8.

Reddy et al,. Occlusion-Net: 2D/3D Occluded Keypoint Localization Using Graph Networks, 2019, IEEE/CVF Conference on Computer Vision and Pattern Recognition, pp. 7318-7327, IEEE Computer Society.

Park et al., Robust multi-task learning and online refinement for spacecraft pose estimation across domain gap, 2023, pp. 1-15, Advances in Space Research.

Gong et al., Research of an Unmanned Aerial Vehicle Autonomous Aerial Refueling Docking Method Based on Binocular Vision, 2023, pp. 1-21, 7, 433.

Morreale et al., Neural Semantic Surface Maps, Sep. 9, 2023, pp. 1-15.

Reed, Benjamin B., The Restore-L Servicing Mission, Mar. 29, 2016, pp. 1-32, retrieved from URL:https://www.nasa.gov/wp-content/uploads/2015/03/reed_restorel_tagged.pdf Jan. 14, 2025.

Parsons et al., Analysis of Simulated Imagery for Real-Time Vision-Based Automate Aerial Refueling, Journal of Aerospace Information Systems, Mar. 2019, pp. 77-93, vol. 16, No. 3.

Newell et al., Stacked Hourglass Networks for Human Pose Estimation, Jul. 2016, pp. 1-17, article obtain from https://arxiv.org/pdf/1603.06937 Sep. 16, 2025.

Extended European Search Report for EP Patent Application No. 24165111.6 dated Jul. 10, 2024.

Lynch, J. C., Monocular Pose Estimation for Automated Aerial Refueling via Perspective-n-PointPerspective-n-Point, AFIT Scholar, Mar. 2022, pp. 1-76, accessed from https://scholar.afit.edu/cgi/viewcontent.cgi?article=7913&context=etd Jul. 17, 2024.

Zhao, et al., "Estimating 6D Pose From Localizing Designated Surface Keypoints", https://arxiv.org/pdf/1812.01387.pdf, accessed Dec. 5, 2023, pp. 1-9.

Xiao et al., "Simple Baselines for Human Pose Estimation and Tracking", https://arxiv.org/pdf/1804.06208.pdf, accessed Dec. 5, 2023, pp. 1-9.

Suwajanakorn, et al., "Discovery of Latent 3D Keypoints via End-to-end Geometric Reasoning", https://keypointnet.github.io/keypointnet_neurips.pdf, accessed Dec. 5, 2023, pp. 1-12.

Lee, et al., "Camera-to-Robot Pose Estimation from a Single Image", 2020 IEEE International Conference on Robotics and Automation (ICRA), 2020, pp. 9426-9432, Paris, France.

Bashir, et al., "Small Object Detection in Remote Sensing Images with Residual Feature Aggregation-Based Super-Resolution and Object Detector Network", Remote Sens., 2021, 13, 1854, pp. 1-21.

Unel, et al., "The Power of Tiling for Small Object Detection", Computer Vision Foundation, pp. 1-10.

Lee, et al., "Online Extrinsic Camera Calibration for Temporally Consistent IPM Using Lane Boundary Observations with a Lane Width Prior", https://arxiv.org/pdf/2008.03722.pdf, accessed Dec. 5, 2023, pp. 1-6.

Zhang, et al., "A Flexible Online Camera Calibration Using Line Segments", Journal of Sensors, 2016, vol. 2016, Article ID 2802343, pp. 1-17, Hindawi Publishing Corporation.

Liu et al., Simple and Principled Uncertainty Estimation with Deterministic Deep Learning via Distance Awareness, 34th Conference on Neural Information Processing Systems, 2020, pp. 1-15, Vancouver, CA.

Guo et al., On Calibration of Modern Neural Networks, Proceedings of the 34th International Conference on Machine Learning, Aug. 3, 2017, pp. 1-14, Sydney, Australia.

Pavlakos, et al., 6-DoF Object Pose from Semantic Keypoints, 2017 IEEE Internation Conference on Robotics and Automation, pp. 1-8.

Extended European Search Report for EP Patent Application No. 24196940.1 dated Mar. 7, 2025.

Extended European Search Report for EP Patent Application No. 24200751.6 dated Mar. 7, 2025.

Dementhon, et al., Model-Based Object Pose in 25 Lines of Code, pp. 1-9.

Extended European Search Report for EP Patent Application No. 24196935.1 dated Feb. 6, 2025.

Shi et al., Fast Uncertainty Quantification for Deep Object Pose Estimation, IEEE International Conference on Robotics and Automation, 2021, pp. 5200-5207.

Vaghi et al., A Comparison of Uncertainty Estimation Approaches for DNN-based Camera Localization, Nov. 2022, pp. 1-7.

Wang et al., Revisiting Monocular Satellite Pose Estimation With Transformer, IEEE Transactions on Aerospace and Electronic Systems, Oct. 2022, pp. 4279-4294, vol. 58, No. 5.

Chen et al., Satellite Pose Estimation with Deep Landmark Regression and Nonlinear Pose Refinement, Computer Vision Foundation, 2019, pp. 1-9.

Quang et al., Monocular Vision and Machine Learning for Pose Estimation, 2023, pp. 128-136.

Extended European Search Report for EP Patent Application No. 24171550.7 dated Oct. 16, 2024, pp. 1-13.

Gupta, et al., "CullNet: Calibrated and Pose Aware Confidence Scores for Object Pose Estimation", 2019 IEEE/CVF International Conference on Computer Vision Workshop (ICCVW), IEEE, Oct. 27, 2019, pp. 2758-2766.

Klein, et al., "Uncertainty in Data-Driven Kalman Filtering for Partially Known State-Space Models", ICASSP 2022—2022 IEEE International Conference on Acoustics, Speech, and Signal Processing (ICASSP), IEEE, May 23, 2022, pp. 3194-3198.

Shi, et al., "Fast Uncertainty Quantification for Deep Object Pose Estimation", Arvix.org, Cornell University Library, Nov. 16, 2020, pp. 1-8.

Teng Chin-Hung, "Enhanced Outlier Removal for Extended Kalman Filter based Visual Inertial Odometry", 2018 IEEE International Conference on Applied System Innovation (ICASI), IEEE, Apr. 13, 2018, pp. 74-77.

Extended European Search Report for EP Patent Application No. 24182647.8 dated Oct. 24, 2024, pp. 1-7.

Extended European Search Report for EP Patent Application No. 24183945.5 dated Nov. 20, 2024, pp. 1-8.

Lee, et al., "Long-Range Pose Estimation for Aerial Refueling Approaches Using Deep Neural Networks", Journal of Aerospace Information Systems, vol. 17, No. 11, Nov. 1, 2020, pp. 634-646.

Thomas, et al., "Advances in air to air refuelling", Progress in Aerospace Sciences, vol. 71, Jul. 28, 2014, pp. 14-35.

Hao et al., Scale-unambiguous relative pose estimation of space uncooperative targets based on the fusion of three-dimensional time-of-flight camera and monocular camera, Optical Engineering, May 2015, pp. 1-12, vol. 54(5).

EP Office Action for EP Patent Application No. 24182647.8 dated Mar. 17, 2026.

* cited by examiner

AERIAL REFUELING SYSTEMS AND METHODS

FIELD

This disclosure relates generally to aerial refueling, and more particularly to controlling aerial refueling operation.

BACKGROUND

Automation of aerial refueling provides safety benefits for a tanker aircraft and a receiver aircraft. However, accurately and efficiently conducting a refueling operation using cameras can be difficult when practicing current automated techniques.

SUMMARY

The subject matter of the present application has been developed in response to the present state of the art, and in particular, in response to the shortcomings of conventional aerial refueling techniques, that have not yet been fully solved by currently available techniques. Accordingly, the subject matter of the present application has been developed to provide systems and methods for providing aerial refueling techniques that overcome at least some of the above-discussed shortcomings of prior art techniques.

The following is a non-exhaustive list of examples, which may or may not be claimed, of the subject matter, disclosed herein.

In one example, a method includes receiving a two-dimensional (2D) image from a camera, cropping the 2D image based on predefined feature areas of interest of a target object to produce a plurality of cropped images, resizing one or more of the cropped images responsive to the target object being greater than a threshold distance from the camera to produce one or more resized images, determining 2D keypoints of the target object within the one or more resized images or the plurality of cropped images, estimating a 6 degrees-of-freedom (6DOF) pose based on the 2D keypoints and a three-dimensional (3D) model of the target object to produce an estimated 6DOF pose, and outputting the 6DOF pose.

In another example, a tanker aircraft includes a refueling boom, a camera configured to generate a 2D image of an in-flight refueling operation between a receiver aircraft and the tanker aircraft, a processor, and non-transitory computer readable storage media storing code. The code being executable by the processor to perform operations including cropping the 2D image based on predefined feature areas of interest of the receiver aircraft to produce a plurality of cropped images, resizing one or more of the cropped images responsive to the receiver aircraft being greater than a threshold distance from the camera to produce one or more resized images, determining 2D keypoints of the receiver aircraft within the one or more resized images or the plurality of cropped images, estimating a 6DOF pose based on the 2D keypoints and a 3D model of the receiver aircraft to produce an estimated 6DOF pose, and outputting the 6DOF pose.

In still another example, a system includes a camera configured to generate a 2D image of an in-flight refueling operation between a receiver aircraft and a tanker aircraft, a processor, and non-transitory computer readable storage media storing code. The code being executable by the processor to perform operations including cropping the 2D image based on predefined feature areas of interest of the receiver aircraft to produce a plurality of cropped images; resizing one or more of the cropped images responsive to the receiver aircraft being greater than a threshold distance from the camera to produce one or more resized images, determining 2D keypoints of the receiver aircraft within the one or more resized images or the plurality of cropped images, estimating a 6DOF pose based on the 2D keypoints and a 3D model of the receiver aircraft to produce an estimated 6DOF pose, and outputting the 6DOF pose.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which:

FIG. 5-1 is a schematic flow diagram of steps of the method of FIG. 4, according to one or more examples of the present disclosure;

FIG. 5-2 is an expanded view of a component FIG. 5-1, according to one or more examples of the present disclosure;

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
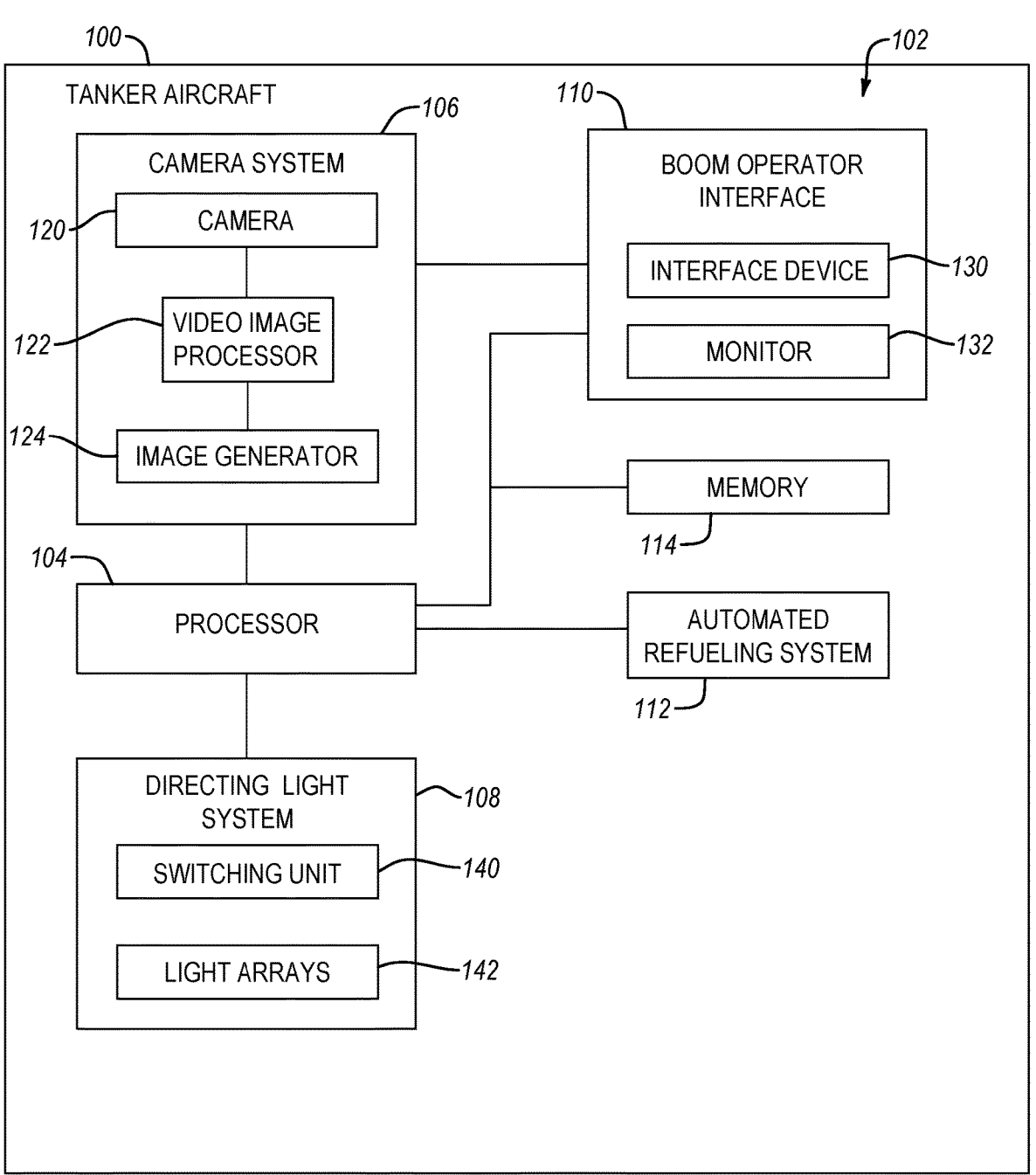
FIG. 1 is a schematic block diagram of a tanker aircraft with an automated director light system, according to one or more examples of the present disclosure.

Disclosed herein is a refueling system 102 located on a tanker aircraft 100 that provides a determination of whether a two-dimensional (2D) to three-dimensional (3D) pose estimation system is correct. In various embodiments, systems and methods extract smaller native (full resolution) regions of interest to train and detect the keypoints used for 6 degree-of freedom (6DOF) estimation at a higher accuracy. This determination can be supplied to an aerial refueling system for controlling output to receiver aircraft pilots, boom operators, and/or automated aerial refueling components during aerial refueling operations. As shown in FIG. 1, the refueling system 102 includes a processor 104, a camera system 106, a director light system 108 (e.g., directing light system), a boom operator interface 110, an automated refueling system 112, and memory 114.

Figure 2:
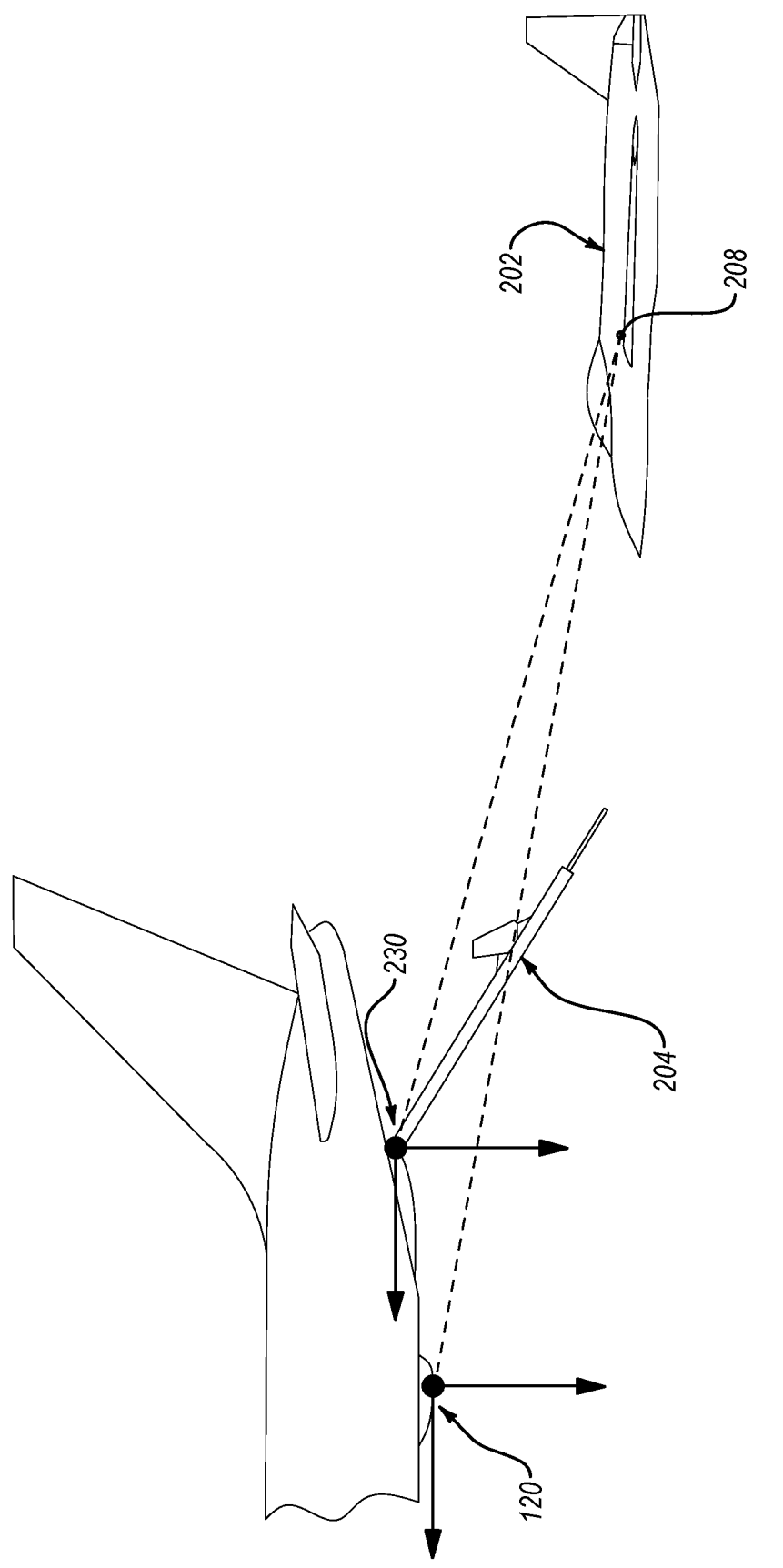
FIG. 2 is a schematic, side view of an aircraft refueling operation, according to one or more examples of the present disclosure.

In various embodiments, referring to FIGS. 1 and 2, the camera system 106 includes a camera 120, a video image processor 122, and an image generator 124. The camera 120 is mounted to a fixed platform within a fared housing attached to the lower aft fuselage of the tanker aircraft 100 (see, e.g., FIG. 2). The camera 120 includes a lens or lenses having remotely operated focus and zoom capability. The camera 120 is located in an aft position relative to and below the tanker aircraft 100. The video image processor 122 receives digitized video images from the camera 120 and generates real-time 2D video images. The digitized video images include the objects viewed by the camera 120 within a vision cone. The image generator 124 then generates images for presentation to a boom operator.

In various embodiments, the boom operator interface 110 includes a user interface device 130 and a monitor 132. Images presented on the monitor 132 are based on information provided by the processor 104. The director light system 108 includes a switching unit 140 and an array of lights 142 (i.e., pilot director lights). The switching unit 140 controls activation of the array of lights 142 based on information provided by the processor 104. The automated refueling system 112 controls operation of the refueling boom 204 and/or the tanker aircraft 100 based on information provided by the processor 104.

In various embodiments, the array of lights 142 is located on the lower forward fuselage of the tanker aircraft 100. The array of lights 142 is positioned to be clearly viewable by the pilot of the receiver aircraft 202. The array of lights 142 include various lights for providing directional information to the pilot of the receiver aircraft 202. The array of lights 142 may include an approach light bar, an elevation light bar, a fore/aft position light bar, four longitudinal reflectors, two lateral reflectors, or other lights.

The camera system 106 produces a two-dimensional (2D) image 300 of a three-dimensional space including at least the receiver aircraft 202. The 2D image 300 includes an approach zone the receiver aircraft 202 enters into prior to beginning refueling operations. The receiver aircraft 202 includes a boom nozzle receptacle 208 capable of coupling to the refueling boom 204 in order to accomplish fuel transfer.

It can be appreciated that refueling or close quarter operations may occur between other vehicles not just the aircraft 100, 202 depicted. The refueling or close quarter operations may occur during adverse weather conditions. The vehicles may be any vehicles that move relative to each other (in water, on land, in air, or in space). The vehicles may also be manned or unmanned. Given by way of non-limiting example, in various embodiments, the vehicles may be a motor vehicle driven by wheels and/or tracks, such as, without limitation, an automobile, a truck, a cargo van, and the like. Given by way of further non-limiting examples, in various embodiments, the vehicles may include a marine vessel such as, without limitation, a boat, a ship, a submarine, a submersible, an autonomous underwater vehicle (AUV), and the like. Given by way of further non-limiting examples, in various embodiments, the vehicles may include other manned or unmanned aircraft such as, without limitation, a fixed wing aircraft, a rotary wing aircraft, and a lighter-than-air (LTA) craft.

It can be appreciated that the image analysis techniques described herein may be used in robotics manufacturing, such as pose estimation of objects for grasping and manipulation and data generation for pose estimation projects.

Figure 3:
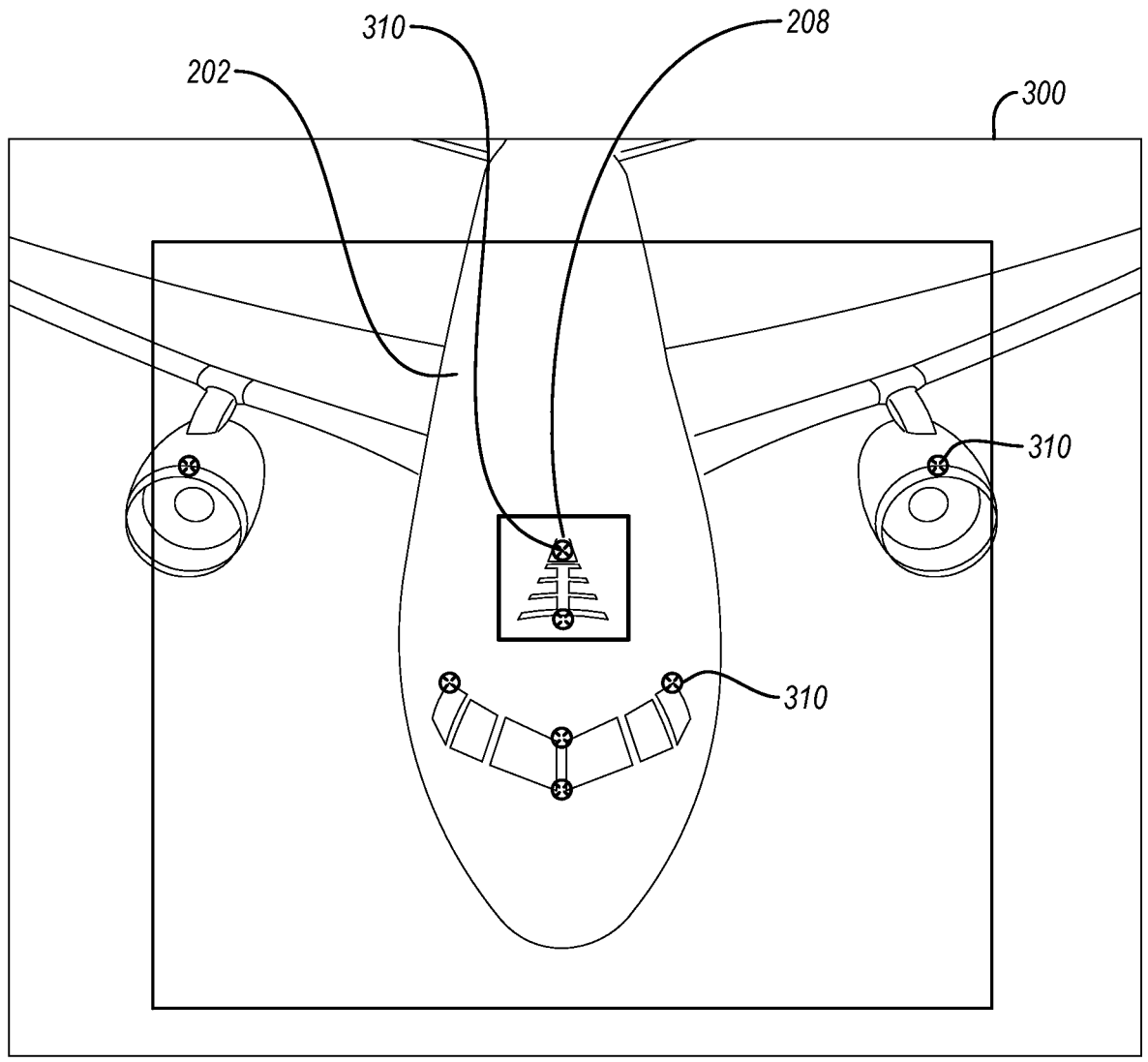
FIG. 3 is a schematic, perspective view of an aircraft refueling operation, according to one or more examples of the present disclosure.

In various embodiments, non-transitory computer readable instructions (i.e., code) stored in the memory 114 (i.e., storage media) cause the processor 104 to use raw image data from a single sensor (i.e., the camera 120) and make the raw data scalable and cost effective to integrate into existing systems. In particular, the processor 104 predicts keypoints 310 (see, e.g., FIG. 3) of the receiver aircraft 202 within the 2D image 300. The keypoints 310 are referenced in 2D space. The prediction is based on a trained deep neural network configured to estimate the pixel location of the keypoints of the refueling boom 204 in the 2D image 300. The processor 104 then performs 2D to 3D correspondence, using a 3D point matching algorithm, by projecting the 2D keypoints 310 into 3D space. Each of the predicted 2D keypoints 310 are projected from 2D space to 3D space using a perspective-n-point (PnP) pose computation to produce a prediction of the refueling boom 204 (i.e., a boom 6 degree-of-freedom (6DOF) position (i.e., pose)). More generally the PnP pose computation produces any parameterization of an object to position it in 3D space. In the specific case of the boom 204, a set of more constrained parameters in the form of the boom control parameters (e.g., boom pitch and roll based on a boom attachment point 230) are produced.

In various embodiments, non-transitory computer readable instructions (i.e., code) stored in the memory 114 (i.e., storage media) cause the processor 104 to predict keypoints 310 (see, e.g., FIG. 3) of the receiver aircraft 202 within the 2D image 300. The keypoints 310 are referenced in 2D space.

In various embodiments, the processor 104 trains a convolutional neural network (CNN) to identify features/keypoints on the 3D model (computer aided design (CAD) model) from a 2D image. The CNN is based on residual network (ResNet) architecture. The CNN removes final pooling and fully connected layers of the architecture and replaces them with a series of deconvolutional and/or upsampling layers to return an output image matching the height and width of the input image with the number of keypoints matching a number channels. Each of the channels is considered to be a heatmap of where the keypoint is located in 2D image space. From the heatmap, the pixel at the center of the distribution represented by the heatmap is chosen to be the position of the keypoint (i.e., the 2D keypoint predictions).

In various embodiments during training of the CNN, the detector (e.g., the CNN) takes as input a rescaled bounding box crop of a video frame and returns as output a black and white heatmap image for each keypoint. The heatmaps' pixel values indicate for each keypoint the likelihood of the 3D virtual object's keypoint being found at each pixel location of the image once the object has been projected onto the image. To train the weights of the CNN, ground truth heatmaps are constructed from ground truth 2D pixel locations. The pixel values of ground truth heatmaps are assigned the values of a Gaussian probability distribution over 2D coordinates with mean equal to the ground truth 2D pixel location and covariance left as a hyperparameter for training. The loss that is minimized during training is composed of the Jensen-Shannon divergence between the CNN's heatmap outputs and the ground truth heatmaps and the Euclidean norm between the CNN's 2D keypoint estimates and the ground truth 2D keypoints.

Each of the predicted 2D keypoints 310 are compared with the corresponding 3D model keypoints using the PnP pose algorithm to produce a 6DOF pose estimate of the position of the receiver aircraft 202 or the refueling boom 204. Then, the processor 104 analyzes the 6DOF pose estimate for potential error. The processor 104 produces a confidence or uncertainty value associated with the 6DOF pose estimate. First, the processor 104 determines a reprojection error. The reprojection error includes a reprojection error for the i-th keypoint estimate. The reprojection error is calculated as the 2D distance between the i-th estimated 2D keypoint and the 2D projection of the i-th 3D model keypoint, using the solved 6DOF pose.

$$\text{Reprojection Error for } i^{th} \text{ keypoint} = \hat{k}_i - P(k_i, R, t)$$

N—Number of keypoints $\hat{k}_i$, $i \in [N]$—i-th 2D keypoint estimate, N total points $k_i$, $i \in N$—i-th 3D model estimate (corresponds to the i-th keypoint estimate), N total points P—Projection operator based on camera parameters R, t—Rotation and translation pose parameters (6DOF)

M—Number of new keypoint sets to sample $\widetilde{k}_i^j$, $i \in [N]$, $j \in [M]$—i-th 2D keypont in j-th new sampled keypoint set, N total points in each set, M total sets of points $R^j$, $t^j$, $j \in [M]$—calculated pose parameters for j-th new sampled keypoint set, M total poses $\lambda$—1D tuning factor, used in sampling $$\eta_i^j \sim N\left(\mu = \begin{bmatrix} 0 \\ 0 \end{bmatrix}, \Sigma = \begin{bmatrix} 1 & 0 \\ 0 & 1 \end{bmatrix}\right)$$

—2D Noise from a normal distribution with mean 0 and identity covariance matrix. N*M total samples, Template notation for noise from a normal distribution.

*—1D multiplication or pointwise multiplication for vectors and matrices $\hat{\Sigma}_i$—2D covariance matrix for i-th keypoint estimate The reprojection error is used to sample a distribution of new sets of keypoints and calculate poses for sampled keypoint sets in order to form a distribution of 6DOF pose results. The processor 104 samples M new sets of keypoints. In order to sample the i-th keypoint in the j-th new set of keypoints, the processor 104 samples noise from a 2D normal distribution with 0 mean and identity covariance. Next, the processor 104 multiplies (i.e., scales) the sampled noise by the absolute value of the reprojection error and a scaling factor which is used to tune the result. The processor 104 then adds the scaled noise to the 2D keypoint estimate. This can be interpreted as sampling from a 2D normal distribution centered on the 2D keypoint estimate, with covariance scaled by the reprojection error.

$$\widetilde{k}_i^j = \left(\eta_i^j * \frac{1}{\lambda} * |\hat{k}_i - P(k_i, R, t)|\right) + P(k_i, R, t)$$

$$\widetilde{k}_i^j \sim N\left(\mu = \hat{k}_i, \ \Sigma = \frac{1}{\lambda} * \hat{\Sigma}_i * \|\hat{k}_i - P(k_i, R, t)\|\right)$$

Next, from the M sampled keypoint sets, the processor 104 obtains M new 6DOF pose estimates. The M 6DOF pose estimates form a distribution of solutions from which the processor 104 calculates a 6DOF standard deviation to represent solution uncertainty. If there is a large variance in statistically plausible 6DOF estimates, then the magnitude of uncertainty should increase accordingly.

In various embodiments, the processor 104 tracks the 6DOF pose of an object over the course of a video using a Kalman filter. The processor 104 updates the Kalman filter with the most recent pose and uses the Kalman filter's resulting mean pose to calculate reprojection error. An extra Kalman filter may be used to smooth uncertainty output.

In various embodiments, the processor 104 produces 3D position of a specific point of interest on the 3D object, after being rotated and translated by the predicted 6DOF pose. The processor 104 tailors uncertainty estimation to the 3D point output. After running the PnP algorithm to obtain a sample pose for each sample keypoint set, the processor 104 uses the sample pose to rotate and translate the 3D object model to calculate a sample 3D point. The result is a distribution over the 3D point of interest. From that distribution, the processor 104 computes a 3D standard deviation to represent solution uncertainty.

Figure 4:
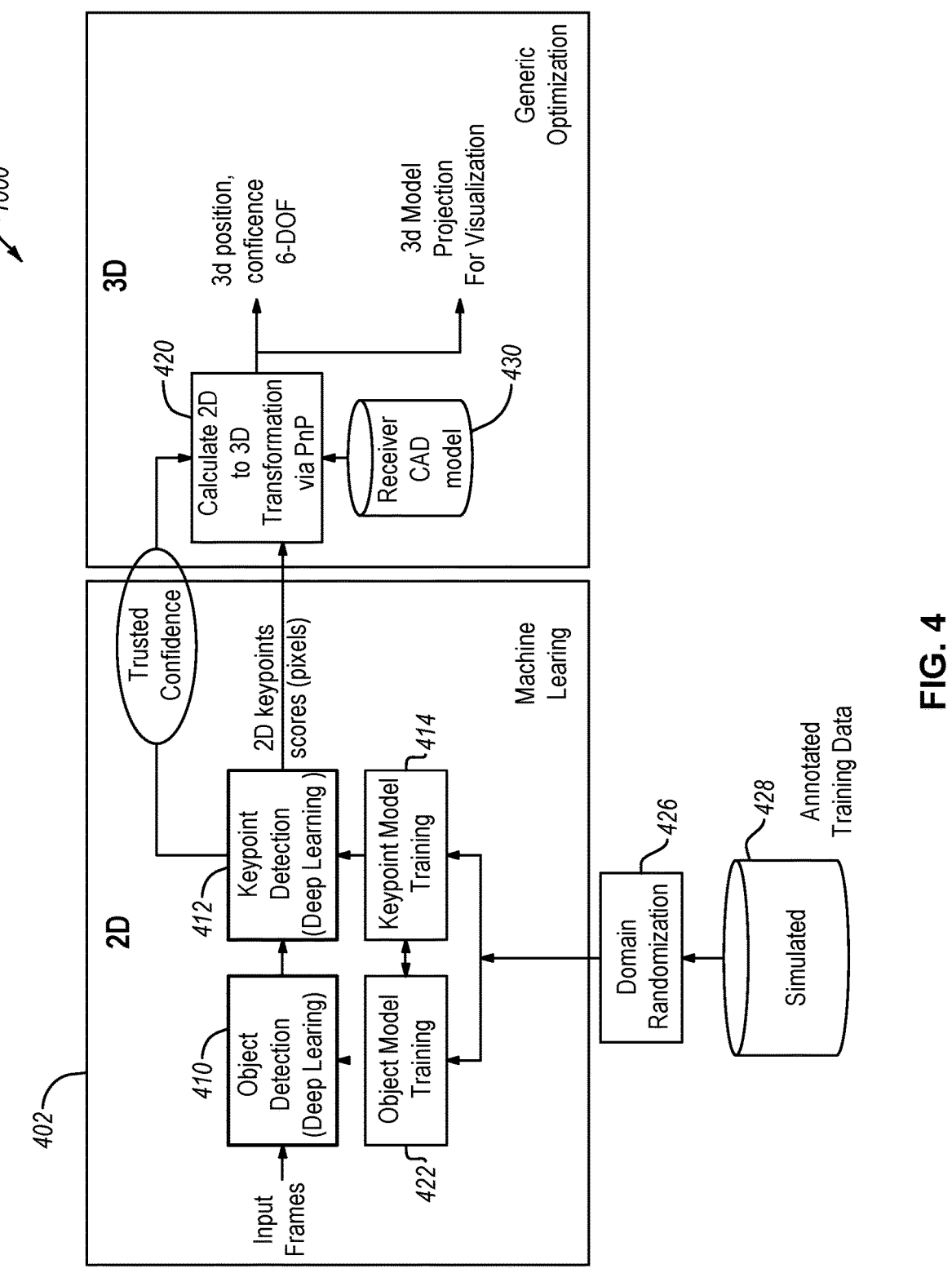
FIG. 4 is a schematic flow diagram of a method of automatically controlling refueling operations, according to one or more examples of the present disclosure.

Referring to FIG. 4, a process 1000 provides a visualization of steps in a 6DOF estimation for air-to-air refueling operations. The process 1000 includes pre-processing machine learning steps 402 (e.g., object model training 422 and keypoint model training block 414) and runtime geometric optimization steps (shape-pose transformation block 420). In the machine learning steps 402, images are received at an object detection step (block 410). After the receiver aircraft 202 is detected at block 410, a crop of an image(s) of the receiver aircraft 202 is made and the cropped image is fed into a keypoint detection step (block 412), which estimates the 2D keypoints of the receiver aircraft 202. Once these 2D keypoints are found, the geometric optimization steps use PnP to find the 6DOF pose of the receiver aircraft 202 given the 2D keypoints, the camera parameters, and a 3D model of the receiver aircraft 202 (block 420 of the geometric optimization steps).

In the keypoint model training (block 414), singular value decomposition (SVD) components may be found using a data matrix created by multiple CAD model variations and random scalings thereof. Each of the CAD model variations has a 2D (number of keypoints multiplied by 3 coordinates per keypoint) array of points, which may be converted to a flat one-dimensional (1D) vector before being added to the data matrix. Then, a mean of all samples in the data matrix (i.e., a base model) is performed. The SVD is then computed based on the difference of the data matrix and the mean of the data matrix. The mean of the data matrix and the SVD components are used later in the shape-pose transformation 420 and are stored as a model in a receiver CAD model storage 430.

The machine learning steps 402 additionally includes object detection 410 which detects the receiving aircraft 202 from the raw image data received from the camera system 106. Detection of the receiving aircraft 202 during the object detection 410 utilizes a trained deep neural network from the object model training 422 that processes the input to output a bounding box around a region of interest of the receiving aircraft 202.

During the keypoint model training 414, a neural network is trained to predict semantic keypoints across all variations of the receiver aircraft 202. The neural network is called a keypoint detector (e.g., associated with the keypoint detection 412). In this case, domain randomization 426 is used to achieve better results using annotated training date stored in a simulated database 428. Another neural network is used as an object detector during the object detection 410, which is trained on input images and bounding boxes. At runtime, the input image(s) from the camera system 106 is cropped by the object detector (the object detection 410), which is then fed into the keypoint detector (the keypoint detection 412). The object detector neural network associated with the object detection 410 predicts bounding boxes from the full-frame image coming from the camera system 106 to get a more localized image of the receiver aircraft to provide input to the keypoint detector during the keypoint detection 412.

A convolutional neural network (CNN) is used for the deep learning-based keypoint detector associated with keypoint detection 412. The keypoint detector is trained on the input images using all the variations of keypoint sets previously created.

Figures 1, 2, 5:
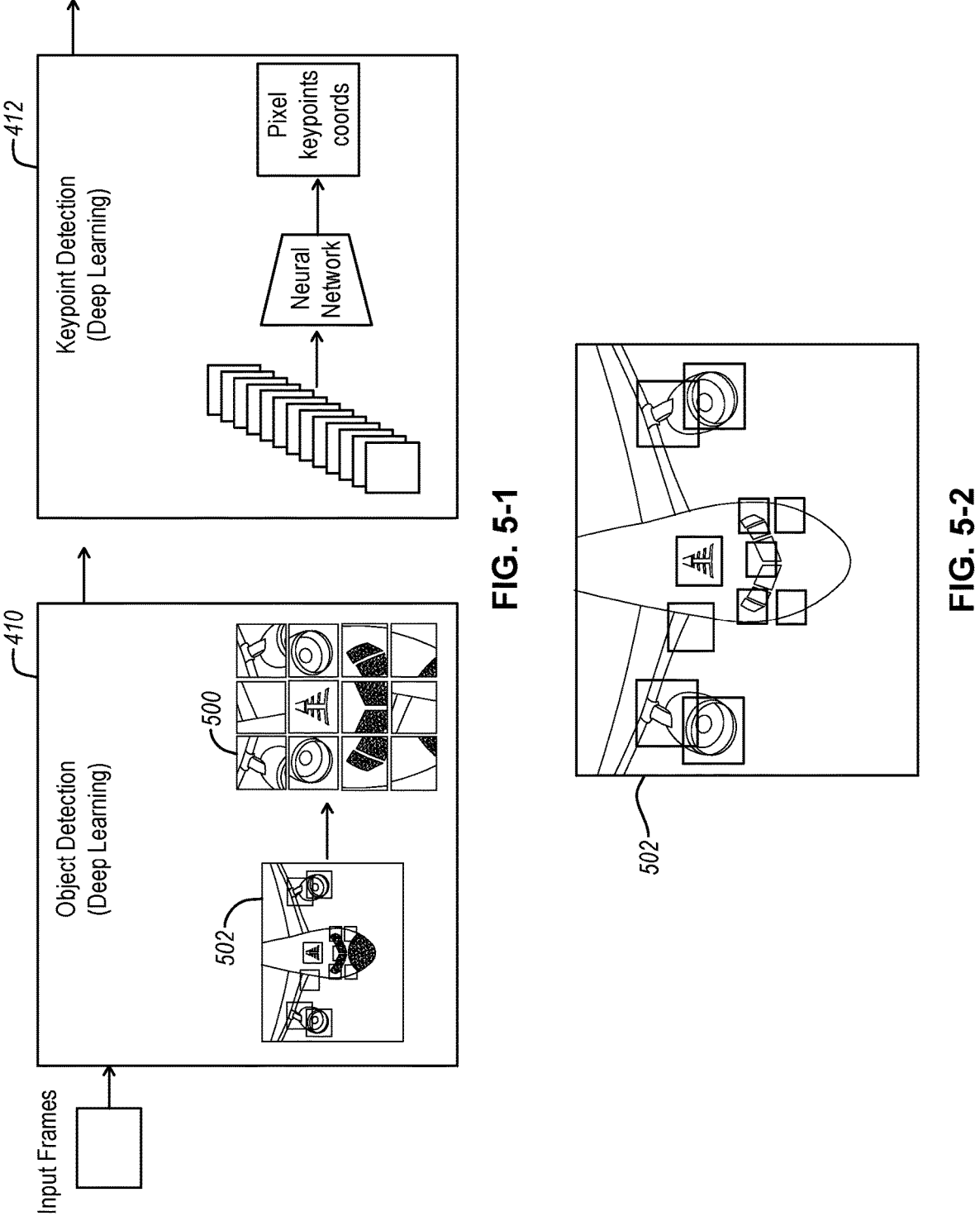

In various embodiments, referring to FIG. 5, an input image 502 is broken up into smaller feature groups (cropped images 500), thus allowing full resolution of desired features and avoiding resizing, which may cause processing speed penalties. This keeps runtime speed at a desirable level. Higher resolution cropped images near regions of interest of an input image provide the keypoint detection neural network as much detail about the relevant features as possible. For air-to-air receiver 6DOF estimations, a cropped image, which shares the same (native) resolution as the input image, is taken of the receiver aircraft 202 and is resized to the input resolution of the keypoint detection neural network. Because the keypoint detection neural network must be able to process in realtime, input resolution should match the input resolution used to train the keypoint detection neural network. If an input image is resized, pixel information is lost, resulting in a degraded representation around relevant image features. In order to resolve, an image of the receiver aircraft 202 is cropped into smaller sections then resized. The resized cropped images are degraded less when resized to match the neural network input resolution. When the receiver aircraft 202 gets to a particular position relative to the camera 120, resizing of some or all of the cropped smaller images are not performed, whereby the native/full resolution representation of those regions are used. Because the cropped smaller images are focused around a local region, such as around the receptacle 208 (FIG. 3), more details of the region are retained. This improves the accuracy of receiver aircraft 6DOF estimations.

Referring to FIGS. 5-1 and 5-2, cropped images 500 are taken from an input image(s) 502 based on feature region(s) of interest. A cropped image 500 is provided for each of the important feature regions. In some examples, all the cropped images 500 provide for all the keypoints used in PnP for 6DOF estimations (block 420). Because resizing the cropped images may cause image degradation, a native crop (i.e., a single crop that includes all the features/keypoints of the receiver aircraft) that has the same resolution as the keypoint detection neural network may be used to avoid resizing. The processor 104, or a user, may choose to use native crops, resized cropped images, or both native crops and resized cropped images. Objects in the single initial cropped image 502 that are further away appear smaller than those objects that are closer. When using native crops, the features of interest in the zoomed-in method (i.e., smaller cropped images) may not take up as much space when the receiver aircraft 202 is farther away, so resizing is used during these instances so that the features take up the majority of the cropped image.

Figures 6, 7, 8:
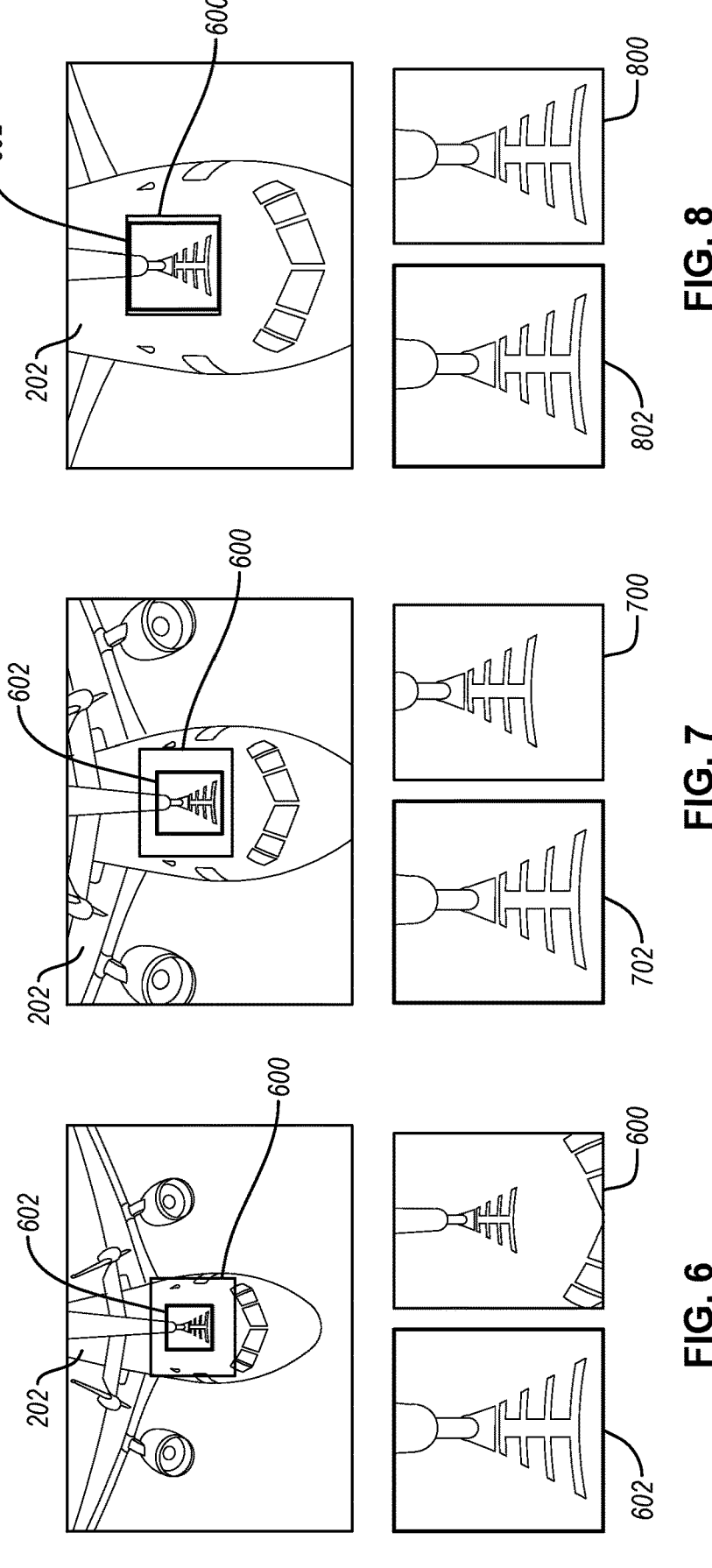
FIG. 6 are cropped images of a refueling aircraft at a first distance.
FIG. 7 are cropped images of a refueling aircraft at a second distance.
FIG. 8 are cropped images of a refueling aircraft at a third distance.

As shown in FIG. 6, the receiver aircraft 202 is just entering the refueling zone. The receptacle features take up less space in a cropped image 600 of the native resolution input image. However, the receptacle features in a resized image 602 are degraded.

As shown in FIG. 7, when the receiver aircraft 202 is closer to the camera 120, a resized cropped image 700 and a cropped image 702 in the native resolution are very similar, with both producing clear images. The cropped image 702 is selected because the pixel values are unaffected by resizing.

As shown in FIG. 8, when the receiver aircraft 202 is at or almost at an ideal refueling position, a resized cropped image 800 and a cropped image 802 in the native resolution are nearly the same. The cropped image 802 is selected because the pixel values are unaffected by resizing.

There is a condition to use native resolution images when the receiver aircraft is estimated to be within a certain distance from the tanker aircraft, which is where conditions such as the cropped image 802 are observed. This distance threshold coincidentally corresponds roughly to when the receiver aircraft is within the contact envelope (this means that the receiver aircraft can physically make contact with the tanker aircraft via the refueling boom).

The following is a non-exhaustive list of examples, which may or may not be claimed, of the subject matter, disclosed herein.

The following portion of this paragraph delineates example 1 of the subject matter, disclosed herein. According to example 1, a method includes receiving a 2D image from a camera, cropping the 2D image based on predefined feature areas of interest of a target object to produce a plurality of cropped images, resizing one or more of the cropped images responsive to the target object being greater than a threshold distance from the camera to produce one or more resized images, determining 2D keypoints of the target object within the one or more resized images or the plurality of cropped images, estimating a 6DOF pose based on the 2D keypoints and a 3D model of the target object to produce an estimated 6DOF pose, and outputting the 6DOF pose.

The following portion of this paragraph delineates example 2 of the subject matter, disclosed herein. According to example 2, which encompasses example 1, above, each of the cropped images includes a plurality of keypoints.

The following portion of this paragraph delineates example 3 of the subject matter, disclosed herein. According to example 3, which encompasses any of examples 1 or 2, above, the target object is a receiving aircraft in a close air operation.

The following portion of this paragraph delineates example 4 of the subject matter, disclosed herein. According to example 4, which encompasses example 3, above, the close air operation is a refueling operation.

The following portion of this paragraph delineates example 5 of the subject matter, disclosed herein. According to example 5, which encompasses any of the previous examples, above, resizing includes resizing to a resolution associated with a previously trained keypoint detection neural network.

The following portion of this paragraph delineates example 6 of the subject matter, disclosed herein. According to example 6, which encompasses example 5, above, resizing is responsive to a resolution of the cropped images.

The following portion of this paragraph delineates example 7 of the subject matter, disclosed herein. According to example 7, which encompasses any of the previous examples, above, before producing the plurality of cropped images, performing an initial single crop of the 2D image.

The following portion of this paragraph delineates example 8 of the subject matter, disclosed herein. According to example 8, which encompasses any of the previous examples, above, performing automated refueling operations responsive to the 6DOF pose.

The following portion of this paragraph delineates example 9 of the subject matter, disclosed herein. According to example 9, a tanker aircraft includes a refueling boom, a camera configured to generate a 2D image of an in-flight refueling operation between a receiver aircraft and the tanker aircraft, a processor, and non-transitory computer readable storage media storing code The code being executable by the processor to perform operations including cropping the 2D image based on predefined feature areas of interest of the receiver aircraft to produce a plurality of cropped images, resizing one or more of the cropped images responsive to the receiver aircraft being greater than a threshold distance from the camera to produce one or more resized images, determining 2D keypoints of the receiver aircraft within the one or more resized images or the plurality of cropped images, estimating a 6DOF pose based on the 2D keypoints and a 3D model of the receiver aircraft to produce an estimated 6DOF pose, and outputting the 6DOF pose.

The following portion of this paragraph delineates example 10 of the subject matter, disclosed herein. According to example 10, which encompasses example 9, above, each of the cropped images includes a plurality of keypoints.

The following portion of this paragraph delineates example 11 of the subject matter, disclosed herein. According to example 11, which encompasses the previous examples, above, resizing includes resizing to a resolution associated with a previously trained keypoint detection neural network.

The following portion of this paragraph delineates example 12 of the subject matter, disclosed herein. According to example 12, which encompasses example 11, above, resizing is responsive to a resolution of the cropped images.

The following portion of this paragraph delineates example 13 of the subject matter, disclosed herein. According to example 13, which encompasses any of the previous examples, above, the code is further configured to cause the processor to perform an initial single crop of the 2D image before producing the plurality of cropped images.

The following portion of this paragraph delineates example 14 of the subject matter, disclosed herein. According to example 14, which encompasses any of any of the previous examples, above, the tanker aircraft further includes an automated refueling system, and a boom operator system or a pilot director light system. The code is further configured to cause the processor to control operations of the automated refueling system, the boom operator system, or the pilot director light system based on the 6DOF pose of the receiver aircraft.

The following portion of this paragraph delineates example 15 of the subject matter, disclosed herein. According to example 15, a system includes a camera configured to generate a 2D image of an in-flight refueling operation between a receiver aircraft and a tanker aircraft, a processor, and non-transitory computer readable storage media storing code. The code being executable by the processor to perform operations including cropping the 2D image based on predefined feature areas of interest of the receiver aircraft to produce a plurality of cropped images, resizing one or more of the cropped images responsive to the receiver aircraft being greater than a threshold distance from the camera to produce one or more resized images, determining 2D keypoints of the receiver aircraft within the one or more resized images or the plurality of cropped images, estimating a 6DOF pose based on the 2D keypoints and a 3D model of the receiver aircraft to produce an estimated 6DOF pose, and outputting the 6DOF pose.

The following portion of this paragraph delineates example 16 of the subject matter, disclosed herein. According to example 16, which encompasses example 15, above, each of the cropped images includes a plurality of keypoints.

The following portion of this paragraph delineates example 17 of the subject matter, disclosed herein. According to example 17, which encompasses example 16, above, resizing includes resizing to a resolution associated with a previously trained keypoint detection neural network.

The following portion of this paragraph delineates example 18 of the subject matter, disclosed herein. According to example 18, which encompasses any of the previous examples, above, resizing is responsive to a resolution of the cropped images.

The following portion of this paragraph delineates example 19 of the subject matter, disclosed herein. According to example 19, which encompasses any of the previous examples, the code is further configured to cause the processor to perform automated refueling operations responsive to the 6DOF pose.

The following portion of this paragraph delineates example 20 of the subject matter, disclosed herein. According to example 20, which encompasses any of the previous examples, above, the code is further configured to generate an uncertainty value of the 6DOF pose.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "config- ured to" perform a specified function is specifically selected, created, implemented, utilized, programmed, and/or designed for the purpose of performing the specified func- tion. As used herein, "configured to" denotes existing char- acteristics of a system, apparatus, structure, article, element, component, or hardware which enable the system, appara- tus, structure, article, element, component, or hardware to perform the specified function without further modification. For purposes of this disclosure, a system, apparatus, struc- ture, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corre- sponding steps shown.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as micro- processors or digital signal processors, computational enti- ties such as operating systems, drivers, graphical user inter- faces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be imple- mented utilizing suitable commercially available compo- nents, such as those typically found in data computing/ communication and/or network computing/communication systems.

The term controller/processor, as used in the foregoing/ following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the- fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit/processor or the like of a controller may, at various times, operate as a component/module for displaying graphics on a screen, a component/module for writing data to a storage medium, a component/module for receiving user input, and a compo- nent/module for multiplying two large prime numbers, by configuring its logical gates in accordance with its instruc- tions. Such reconfiguration may be invisible to the naked eye, and in some embodiments may include activation, deactivation, and/or re-routing of various portions of the component, e.g., switches, logic gates, inputs, and/or out- puts. Thus, in the examples found in the foregoing/following disclosure, if an example includes or recites multiple com- ponents/modules, the example includes the possibility that the same hardware may implement more than one of the recited components/modules, either contemporaneously or at discrete times or timings. The implementation of multiple components/modules, whether using more components/ modules, fewer components/modules, or the same number of components/modules as the number of components/mod- ules, is merely an implementation choice and does not generally affect the operation of the components/modules themselves. Accordingly, it should be understood that any recitation of multiple discrete components/modules in this disclosure includes implementations of those components/ modules as any number of underlying components/modules, including, but not limited to, a single component/module that reconfigures itself over time to carry out the functions of multiple components/modules, and/or multiple compo- nents/modules that similarly reconfigure, and/or special pur- pose reconfigurable components/modules.

In some instances, one or more components may be referred to herein as "configured to," "configured by," "configurable to," "operable/operative to," "adapted/adapt- able," "able to," "conformable/conformed to," etc. Those skilled in the art will recognize that such terms (for example "configured to") generally encompass active-state components and/or inactive-state components and/or standby-state components, unless context requires otherwise.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method comprising:
receiving a two-dimensional (2D) image from a camera;
cropping the 2D image based on predefined feature areas of interest of a target object to produce a plurality of cropped images;
resizing one or more of the plurality of cropped images responsive to the one or more of the plurality of cropped images having a resolution different from a training resolution associated with training of a previously trained keypoint detection neural network to produce one or more resized images, the one or more resized images having a resized resolution equal to the training resolution;
determining 2D keypoints of the target object within a plurality of input images by inputting the plurality of input images into the keypoint detection neural network, the plurality of input images comprising the one or more resized images;
estimating a 6 degrees-of-freedom (6DOF) pose based on the 2D keypoints and a three-dimensional (3D) model of the target object to produce an estimated 6DOF pose; and
outputting the 6DOF pose; wherein the target object is a receiving aircraft in a close air operation, and wherein the plurality of cropped images comprises a first cropped image and a second cropped image and neither the first cropped image nor the second cropped image is entirely contained within the other.

2. The method of claim 1, wherein each of the cropped images includes a plurality of keypoints.

3. The method of claim 1, wherein the close air operation is a refueling operation.

4. The method of claim 1, further comprising, before producing the plurality of cropped images, performing an initial single crop of the 2D image.

5. The method of claim 1, further comprising performing automated refueling operations responsive to the 6DOF pose.

6. The method of claim 1, wherein:
the first cropped image corresponds to a first feature area of interest of the predefined feature areas of interest;
the second cropped image corresponds to a second feature area of interest of the predefined feature areas of interest distinct from the first feature area of interest; and
the first cropped image does not overlap with the second cropped image.

7. A tanker aircraft comprising:
a refueling boom;
a camera configured to generate a two-dimensional (2D) image of an in-flight refueling operation between a receiver aircraft and the tanker aircraft;
a processor; and
non-transitory computer readable storage media storing code, the code being executable by the processor to perform operations comprising:
cropping the 2D image based on predefined feature areas of interest of the receiver aircraft to produce a plurality of cropped images;
resizing one or more of the plurality of cropped images responsive to the one or more of the plurality of cropped images having a resolution different from a training resolution associated with training of a previously trained keypoint detection neural network to produce one or more resized images, the one or more resized images having a resized resolution equal to the training resolution;

determining 2D keypoints of the receiver aircraft within a plurality of input images by inputting the plurality of input images into the keypoint detection neural network, the plurality of input images comprising the one or more resized images;

estimating a 6 degrees-of-freedom (6DOF) pose based on the 2D keypoints and a three-dimensional (3D) model of the receiver aircraft to produce an estimated 6DOF pose; and outputting the 6DOF pose; wherein the plurality of cropped images comprises a first cropped image and a second cropped image and neither the first cropped image nor the second cropped image is entirely contained within the other.

8. The tanker aircraft of claim 7, wherein each of the cropped images includes a plurality of keypoints.

9. The tanker aircraft of claim 7, wherein the code is further configured to cause the processor to perform an initial single crop of the 2D image before producing the plurality of cropped images.

10. The tanker aircraft of claim 7, wherein the tanker aircraft further comprises:

an automated refueling system; and a boom operator system; or a pilot director light system, wherein the code is further configured to cause the processor to control operations of the automated refueling system, the boom operator system, or the pilot director light system based on the 6DOF pose of the receiver aircraft.

11. The tanker aircraft of claim 7, wherein:

the first cropped image corresponds to a first feature area of interest of the predefined feature areas of interest;

the second cropped image corresponds to a second feature area of interest of the predefined feature areas of interest distinct from the first feature area of interest; and the first cropped image does not overlap with the second cropped image.

12. A system comprising:

a camera configured to generate a two-dimensional (2D) image of an in-flight refueling operation between a receiver aircraft and a tanker aircraft;

a processor; and non-transitory computer readable storage media storing code, the code being executable by the processor to perform operations comprising:

cropping the 2D image based on predefined feature areas of interest of the receiver aircraft to produce a plurality of cropped images;

resizing one or more of the plurality of cropped images responsive to the one or more of the plurality of cropped images having a resolution different from a training resolution associated with training of a previously trained keypoint detection neural network to produce one or more resized images, the one or more resized images having a resized resolution equal to the training resolution;

determining 2D keypoints of the receiver aircraft within a plurality of input images by inputting the plurality of input images into the keypoint detection neural network, the plurality of input images comprising the one or more resized images;

estimating a 6 degrees-of-freedom (6DOF) pose based on the 2D keypoints and a three-dimensional (3D) model of the receiver aircraft to produce an estimated 6DOF pose; and outputting the 6DOF pose; wherein the plurality of cropped images comprises a first cropped image and a second cropped image and neither the first cropped image nor the second cropped image is entirely contained within the other.

13. The system of claim 12, wherein each of the cropped images includes a plurality of keypoints.

14. The system of claim 12, wherein the code is further configured to cause the processor to perform automated refueling operations responsive to the 6DOF pose.

15. The system of claim 12, wherein the code is further configured to generate an uncertainty value of the 6DOF pose.

16. The system of claim 12, wherein:

the first cropped image corresponds to a first feature area of interest of the predefined feature areas of interest;

the second cropped image corresponds to a second feature area of interest of the predefined feature areas of interest distinct from the first feature area of interest; and the first cropped image does not overlap with the second cropped image.

* * * * *